July 13, 1954  L. H. FLORA  2,683,577
FASTENER FOR INSTRUMENT MOUNTING
Filed Aug. 24, 1950
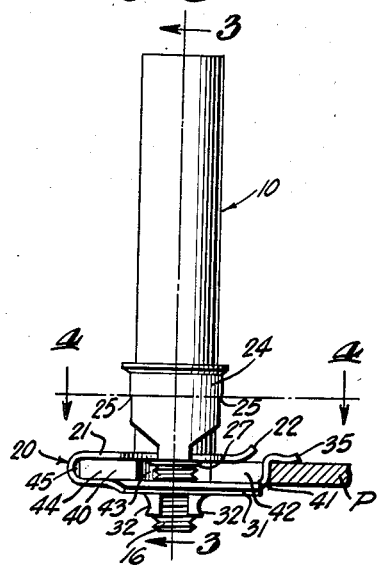
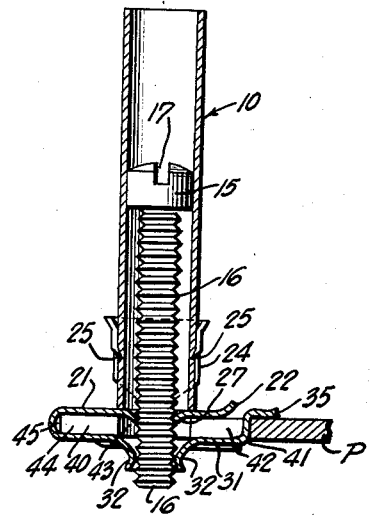
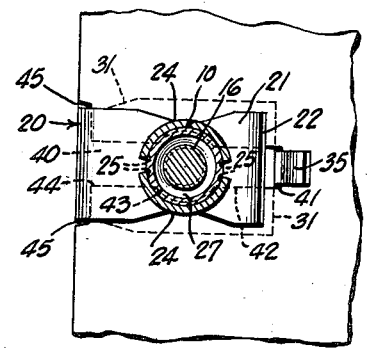
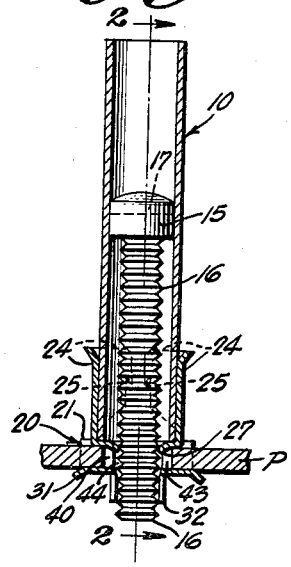
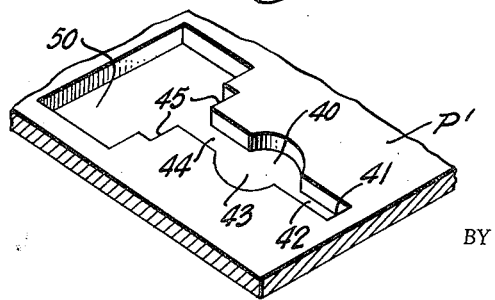
INVENTOR
LAURENCE H. FLORA Patented July 13, 1954

2,683,577

UNITED STATES PATENT OFFICE 2,683,577

FASTENER FOR INSTRUMENT MOUNTING

Laurence H. Flora, Cleveland, Ohio, assignor to Tinnerman Products, Inc., Cleveland, Ohio, a corporation of Ohio Application August 24, 1950, Serial No. 181,227

5 Claims. (Cl. 248—27)

1

This invention relates, in general, to an improved mounting for instruments of the type which comprise a tubular instrument body, or the like, that is supported in generally perpendicular relationship to a plate, panel or similar part of an apparatus.

More particularly, the invention deals with an improved instrument mounting and fastener therefor in the form of a metallic spring clip for securing instruments such as capacitors, condensers, tuning elements, or the like control units of radio and television apparatus, etc., that include a tubular body member such as a coil form, for example, which is mounted firmly and rigidly in generally normal relation to a supporting panel or plate in an installation.

A primary object of the invention is to provide an improved instrument mounting of this character which comprises a simplified fastener in the form of a generally U-shaped spring clip having a pair of arms adapted for clasping engagement with the opposite surfaces of a plate or panel supporting member in attached position, with one of said arms of the spring clip including means for supporting the tubular instrument body, or the like, in generally normal relation to the supporting plate or panel.

A further object of the invention is to provide such a mounting and spring clip in which one or both of the panel clasping arms of the spring clip is provided with means for supporting a screw threaded member of the instrument in axially adjustable relation to the instrument body.

A more specific object of the invention is to provide an instrument mounting comprising a generally U-shaped spring clip having a pair of panel clasping arms, as aforesaid, wherein a portion of the clip is adapted to secure the tubular body member of the instrument in mounted position against rotation, while another portion of the clip is provided with means for threadedly engaging an axially adjustable screw threaded member of the instrument, and further, with still another portion of the clip provided with means for preventing displacement or loosening of the adjustable screw threaded member from any desired setting or adjusted position thereof.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout the same, and in which:

Fig. 1 is a side elevational view of an instrument mounting in accordance with the invention as provided by a generally U-shaped, clasp-type spring clip or fastener shown in applied position over an edge of a supporting plate or panel member, represented partly in section;

Fig. 2 is a vertical sectional view of the instrument mounting and fastener shown in Fig. 1;

Fig. 3 is a vertical sectional view of the instrument mounting shown in Fig. 1 as seen along line 3—3 of Fig. 1, looking in the direction of the arrows;

Fig. 4 is a sectional view along line 4—4 of Fig. 1 showing the spring clip as attached over a specially prepared recess or hole layout adjacent an outer edge of the panel, as illustrated in dotted lines; and, Fig. 5 shows a similar hole layout or recess provided in the supporting panel for attaching the fastener when the instrument is mounted at a point materially spaced from the periphery of the supporting panel or plate.

Referring now, more particularly, to the drawings, Figs. 1–4, inclusive, illustrate the general organization of a mounting for an instrument such as a capacitor, trimmer, condenser, or the like, on a panel or plate member P forming a part of the chassis in a radio or television set, for example, or other electronic apparatus. The instrument is shown as of the general character which comprises a tubular instrument body 10 in the nature of a sleeve, post, cylinder, or the like, defining a coil form on which there may be wound one or more electrical windings (not shown). The tubular body or coil form 10 may be of any suitable material and usually is in the form of a fibre tube, or the like. A core 15 which is axially adjustable in said tube 10 is provided in the manner of a headed screw having a threaded shank 16 and a recess 17 in one end for receiving a screw driver or other tool for turning the screw in providing any desired adjustment thereof. The coil form 10 and the core 15 which is axially adjustable therein, are retained in operative assembled relation by the improved spring clip or fastener 20 of the invention which otherwise serves to mount the assembly over a recess adjacent an edge of the panel P, as presently to be described.

The spring clip or fastener, designated generally 20, is a relatively simple and inexpensive article of manufacture which may be made at low cost from a comparatively small, inexpensive section of any suitable sheet metal, preferably of a spring metal nature such as spring steel or cold rolled metal having spring-like characteristics. The fastener, in modified forms, may be provided from sheet metal sections of various outlines, of course, but from the standpoint of economical quantity production is most advantageously formed from a generally rectangular blank obtained from standard sheet metal strip stock with a minimum loss or waste of material.

The spring clip or fastener 20 is provided from a suitable blank of sheet metal bent upon itself in a return bend defining a pair of arms 21, 31, extending in the same general direction and having a normal spacing slightly less than the thickness of the panel P. The arrangement, is such that said spaced arms 21, 31, are adapted to be flexed apart to receive an edge portion of the panel P therebetween and clasp the same under constant spring tension to retain the clip firmly and rigidly in attached position on the panel.

The upper arm 21 of the clip appears substantially as shown in Fig. 4 and preferably has the free end thereof bent slightly outwardly to define an outwardly flared lip 22 which facilitates the attachment of the clip in the initial application thereof over the edge of the panel P. The arm 21 is provided with a socket portion for holding the tubular coil form 10 and, in the present example, such a socket is shown provided by a pair of flanges or cup-shaped sections 24 on opposite side edges of said arm 21 and which are bent outwardly in the same general direction and curved in a shape corresponding substantially to the contour of said coil form. The edges of said curved flanges 24 are provided with V-shaped cuts defining downwardly extending prongs 25, Figs. 2 and 3, which are bent slightly inwardly as seen in Fig. 2. The arrangement is such that said curved flanges 24 are adapted to receive and grip the coil form 10 firmly and rigidly under spring tension in applied position between said flanges 24, and, in this relation, said prongs 25 dig into and become embedded in the surface of the tubular coil form 10 to anchor the same against rotation and reverse movement from such applied position between said curved flanges 24.

Between the curved flanges 24 or other means defining the socket for the tubular coil form 10, there is provided in the arm 21 an inwardly extending protuberance 27, Figs. 2 and 3, having an opening for the screw 16 of the axially adjustable core 15 within said coil form 10. This opening in the protuberance 27 may be provided either as a simple passage for the screw 16 or as a thread opening, the edges of which are bent to lie on a helix corresponding to that of the thread convolutions of the screw 16 for threadedly engaging the same in the manner of a nut.

The lower or attaching arm 31 is provided with a screw passage in line with the screw opening in the protuberance 27 on arm 21, and said passage is defined by the space between a pair of spaced tongues 32 partially severed from said arm 31 and bent outwardly out of the plane of said arm 31. These tongues 32 are disposed at diametrically opposite sides of the screw shank 16 and preferably are curved to correspond with the contour of the screw in a manner to engage the crests of the thread convolutions thereon in a friction tight fit. In a preferred form, these friction tongues 32 are provided on the arm 31 by a pair of spaced parallel slits on opposite sides of an intermediate transverse slit defining the extremities of the tongues, and the tongues thereupon curved and bent outwardly from said arm 31.

The free end of said arm 31 is provided with a projecting hook 35 which extends inwardly toward the arm 21 a distance approximating the thickness of the panel P, and thence laterally outwardly for engaging the panel adjacent the fastener receiving recess therein, as presently to be described.

The spring clip 20, thus provided, is adapted to be attached adjacent an edge of the supporting panel P by means of an attaching hole 40 provided in an edge of said panel as shown in dotted lines in Fig. 4, or, at any area materially within the periphery of a panel P', Fig. 5, by means of the similar hole 40 which includes an assembling recess 50 in communication therewith for inserting the spring clip 20 in position to be attached over said hole 40 in a similar manner.

In either case, the fastener attaching hole 40 is provided substantially as a slot extending in the direction of the arms 21, 31, of the spring clip 20 in attached position. The slot 40 defines an end wall 41, a slot portion 42 of slightly greater width than the hook 35 of the spring clip, an intermediate enlarged aperture 43 for receiving the protuberance 27 on the spring clip, a slot portion 44 sufficiently wide to pass the screw 16, and a countersunk or notched portion 45 at the entrance to said slot 40 approximating the width of the clip 20 in the area of the bight portion between the arms 21, 31, thereof.

In the installation of the instrument mounting, the parts of the instrument preferably are first assembled with the spring clip 20, and this assembly then attached as a unit over the hole 40 prepared in the panel P. The tubular coil form 10 or similar instrument body is inserted in the socket provided by the curved flanges 24 and the core 15 received in said coil form 10 with the screw 16 thereof threadedly engaged in the thread opening in the protuberance 27 on arm 21 and frictionally engaged between the friction tongues 32 on arm 31, as shown in Figs. 2 and 3. The core 15 may be thus assembled with the spring clip 20 either before or after the coil form 10 is assembled in the socket defined by the curved flanges 24. The said curved flanges 24 yield as necessary for this purpose and the downwardly directed prongs 25 permit sliding of the coil form 10 to fully assembled position between said flanges 24 in which relation, said prongs 25 become embedded in said coil form 10 to anchor the same between said flanges 24 against rotative as well as reverse axial movement from such assembled relation with said spring clip 20.

The assembly thus provided of the members 10, 15, of the instrument and the clip fastener 20 is easily and quickly attached as a unit over the edge of the panel P prepared with the hole layout 40, as aforesaid. The free ends of the arms 21, 31, of the clip are positioned adjacent the open end of the hole 40 and said arms spread apart as necessary to receive the panel P therebetween. The spring clip is then advanced to the fully attached position shown in Figs. 1–3, inclusive, in a manner whereby the hook 35 passes entirely through the slot 40 to a position adjacent the end wall 41 of said slot where the extremity of said hook 35 seats in overlapping relation to the adjacent portion of the panel P. The extremity of said hook 35 thus cooperates with the arm 31 in engaging opposite sides of the panel P to prevent distortion or undesired flexing of said arm 31 outwardly from its proper attached position to said panel, thereby serving to rigidify the mounting on the instrument on the panel P. At the same time, as the hook 35 is applied to said attached position, the screw 16 passes through the slot portion 44 to a position in which it extends through the enlarged central aperture 43, while the surrounding protuberance 27 on said arm 21 snaps into said aperture 43 to serve substantially as a detent or indexing means engageable with the marginal portions of said aperture 43 to retain the spring clip 20 against shifting or displacement from attached position on the panel P. The spring clip 20 in attached position otherwise has the bight portion thereof between the arms 21, 31, snugly received in the notched portion 45 at the entrance to the slot 40 such that lateral shifting or turning of the clip from attached position is prevented.

It will be appreciated, accordingly, that the spring 20 is retained firmly and rigidly in attached position on the panel P, by a combination of forces acting together, the same being provided by the gripping action of the arms 21, 31, with the panel P, the extremity of the hook 35 cooperating with the arm 31 in engaging opposite faces of said panel P, the protuberance 27 on the arm 21 serving as a detent in the aperture 43, and the bight portion of the clip received in the notched portion 45 of the panel at the entrance to the slot 40.

The firm and rigid attachment of the clip 20 on the panel P in turn provides for a firm and rigid mounting of the instrument on said panel in a manner whereby the coil form 10 is fixedly secured by the curved flanges 24 of the clip, as aforesaid, and the screw 16 of the core 15 within said coil form 10 is threadedly engaged in the helical thread opening in the protuberance 27 on the arm 21 in cooperation with the aligned tongues 32 on arm 31 which engage the crests of the thread convolutions on said screw 16.

The thread engaging means defined by the thread opening in protuberance 27 may be provided in any suitable manner, as by a simple circular opening having its edges warped to lie on a helix, or by a similar keyhole type of thread opening, or by a hole having an annular collar which is tapped to provide one or more threads for the same general purpose. In certain applications, such thread opening in the protuberance 27 is provided as a clearance hole for said screw 16, whereupon the friction tongues 32 on arm 31 suitably support the screw 16 within the coil form 10 and with the core 15 axially adjustable in said coil form.

In the preferred form of the spring clip 20, the thread opening in the protuberance 27 threadedly engages the screw 16 in cooperation with the tongues 32 frictionally and grippingly engaging the crests of the thread convolutions on the screw 16 to produce a pronounced thread locking action thereon. The friction tongues 32 serve to bolster and maintain the adjusting screw in substantially perpendicular relation to the arms 21, 31, of the clip and otherwise hold said screw 16 in a substantial thread locking action in any adjusted position against accidental turning or unintended rotation which ordinarily would disturb the setting of said screw 16. However, even through the adjusting screw 16 is thus retained in a thread locking action under the various spring forces set up on the thread thereof, said screw 16 is capable of fine, minute adjustments by means of a tool applied to the recess 17 to turn the same as required in providing any necessary setting of the core 15 within the body of the coil form 10.

In any form, the fastener is preferably constructed of relatively thin sheet metal, the thickness of which is selected according to service requirements and the predetermined size of the parts of the mounting. The fasteners are most effective when provided of spring metal suitably spring tempered and heat treated to give the desired toughness or hardness, particularly in the case of fasteners which are used in installations where extreme vibratory motion takes place. A cheap but effective fastener may also be provided from cold rolled metal which is of a spring metal nature and capable of providing a satisfactory and reliable instrument mounting in accordance with the invention.

While the invention has been described in detail with a specific example, such example is intended as an illustration only inasmuch as it will be apparent that there are numerous possible modifications and variations in the construction, arrangement and general combination of elements and details of the present disclosure which fall within the spirit and scope of the invention.

What is claimed is:

1. A clip comprising a sheet metal body bent to define a pair of spaced arms extending in the same general direction and adapted to clasp an apertured plate therebetween for mounting thereon an instrument comprising a tubular instrument body and an adjustable member in said tubular instrument body having an axially extending shank, one of said arms of the clip being provided with flanges extending from the sides of said arm and bent outwardly therefrom to provide means for mounting said body of said instrument on said plate, said arm having an opening between said flanges for receiving said shank of the adjustable member of said instrument, the second arm of the clip having an opening in line with said opening in said first mentioned arm of the clip, and means adjacent the opening in said second arm for engaging said shank of said adjustable member of the instrument.

2. A clip comprising a sheet metal body bent to define a pair of spaced arms extending in the same general direction and adapted to clasp an apertured plate therebetween for mounting thereon an instrument comprising a tubular instrument body and an adjustable member in said tubular instrument body having an axially extending shank, one of said arms of the clip being provided with flanges extending from the sides of said arm and bent outwardly therefrom to provide means for mounting said body of said instrument on said plate, said arm having an opening between said flanges for receiving said shank of the adjustable member of said instrument, the second arm of the clip having an opening in line with said opening in said first mentioned arm of the clip, and a pair of spaced tongues adjacent the opening in said second arm for engaging said shank of said adjustable member of the instrument.

3. A clip comprising a sheet metal body bent to define a pair of spaced arms extending in the same general direction and adapted to clasp an apertured plate therebetween for mounting thereon an instrument comprising a tubular instrument body and an adjustable member in said tubular instrument body having an axially extending threaded shank, one of said arms of the clip being provided with flanges extending from the sides of said arm and bent outwardly therefrom to provide means for mounting said body of said instrument on said plate, said arm having an opening between said flanges and means adjacent said opening for threadedly engaging said threaded shank of the adjustable member of said instrument, the second arm of the clip having an opening in line with said opening in said first mentioned arm of the clip, and means adjacent the opening in said second arm for frictionally engaging said threaded shank of said adjustable member of the instrument.

4. A clip comprising a sheet metal body bent to define a pair of spaced arms extending in the same general direction and adapted to clasp an apertured plate therebetween for mounting thereon an instrument comprising a tubular instrument body and an adjustable member in said tubular instrument body having an axially extending threaded shank, one of said arms of the clip being provided with flanges extending from the sides of said arm and bent outwardly therefrom to provide means for mounting said body of said instrument on said plate, said arm having an opening between said flanges and means adjacent said opening for threadedly engaging said threaded shank of the adjustable member of said instrument, the second arm of the clip having an opening in line with said opening in said first mentioned arm of the clip, and a pair of spaced tongues adjacent the opening in said second arm for engaging the crests of the thread convolutions on said threaded shank of said adjustable member of the instrument.

5. A clip comprising a sheet metal body bent to define a pair of spaced arms extending in the same general direction and adapted to clasp an apertured plate therebetween for mounting thereon an instrument comprising a tubular instrument body and an adjustable member in said tubular instrument body having an axially extending threaded shank, one of said arms of the clip being provided with flanges extending from the sides of said arm and bent outwardly therefrom to provide means for mounting said body of said instrument on said plate, said arm having an opening between said flanges and means adjacent said opening for threadedly engaging said threaded shank of the adjustable member of said instrument, the second arm of the clip having an opening in line with said opening in said first mentioned arm of the clip, a pair of spaced tongues adjacent the opening in said second arm for engaging the crests of the thread convolutions on said threaded shank of said adjustable member of the instrument, and a hook on said second arm projecting inwardly between said spaced arms of the clip and adapted to extend through the aperture in said plate and cooperate with said second arm in engaging opposite sides of said plate to retain said second arm in attached position on said plate.

References Cited in the file of this patent

UNITED STATES PATENTS

| Number | Name | Date |
|---|---|---|
| 2,274,014 | Tinnerman | Feb. 24, 1942 |
| 2,326,903 | Tinnerman | Aug. 17, 1943 |
| 2,399,957 | Tinnerman | May 7, 1946 |
| 2,539,172 | Andrews | Jan. 23, 1951 |
| 2,552,499 | Tinnerman | May 8, 1951 |

FOREIGN PATENTS

| Number | Country | Date |
|---|---|---|
| 527,340 | Great Britain | Oct. 7, 1940 |
| 566,458 | Great Britain | Jan. 1, 1945 |